W. Jenks,
Fish Hook.
No. 5,748. Patented Sep. 5, 1848.

UNITED STATES PATENT OFFICE.

WARREN JENKS, OF SCHROON, NEW YORK.

METHOD OF SETTING STEEL TRAPS.

Specification forming part of Letters Patent No. 5,748, dated September 5, 1848.

*To all whom it may concern:*

Be it known that I, WARREN JENKS, of the town of Schroon, in the county of Essex and State of New York, have invented a new and Improved Steel Trap for Catching and Holding all Kinds of Fish, also all kinds of land animals, and animals inhabiting both land and water, and also fowls; and I do hereby declare that the following is a full, clear, and exact description of the construction and operation of the same, reference being had to the annexed drawings, making a part of this specification, in which—

Figure 1:
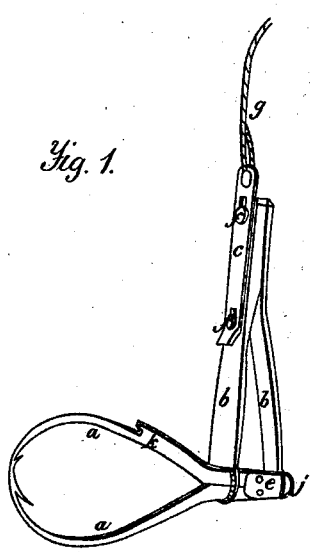
Figure 2:
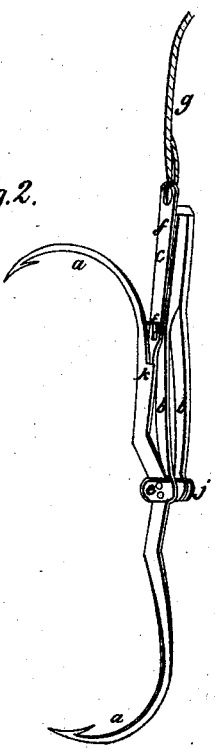
Figure 3:
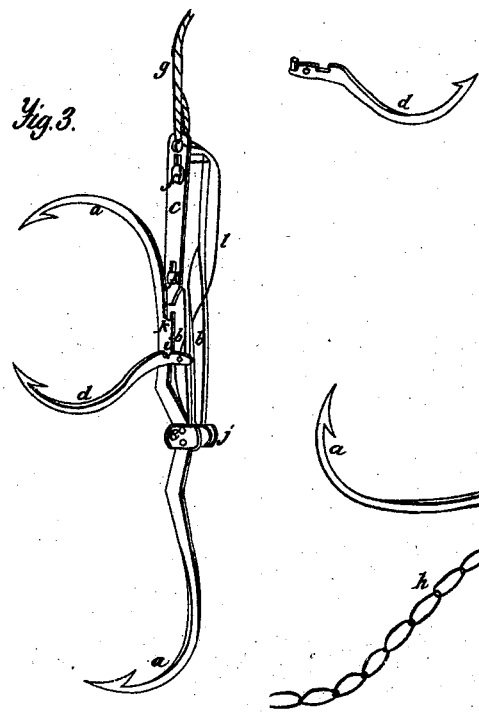
Figure 4:
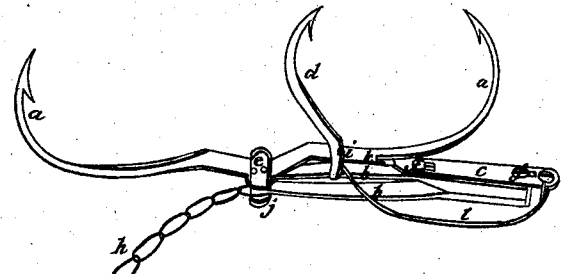

Figure 1 is a perspective view of one of my traps. Fig. 2 represents one of them when set by the use of a slide and a notch in one of the hooks. Fig. 3 represents one of the traps set (without the use of the slide) by the aid of a center hook. Fig. 4 is a view of one of my traps in a horizontal position set with the center hook.

The nature of my invention consists in causing both of the hooks made fast to the trap to be thrown forward by the spring, either in a horizontal or perpendicular direction, so that when the animal springs the trap by taking the bait on the middle hook the lower hook will be forced into the throat beneath the under jaw, and the upper one into the head or neck on the upper side, thus penetrating until they meet at the points, or, if sprung by passing over it, that the hooks will be forced into the body of the animal on each side.

The same letters refer to the same parts in all the figures.

$a\ a$ are bearded hooks, (of the shape represented in Fig. 2,) made of iron or steel, and having one end fastened in the strap or stirrup $e$ with a rivet, which allows them to open, as shown in Fig. 2. The ends which are made fast in the stirrup and acted upon by the spring are flattened, and when the trap is sprung form a joint, as shown in Fig. 1.

$b\ b$ is a spring formed of two pieces of steel, substantially in the shape represented, and fastened together at the end by the rivet $f$, the other ends being formed so that one part shall encircle the hooks and act upon them to force them together in the manner of a slide, and the other made fast to the stirrup, as shown in Fig. 1.

$c$ is a slide made of iron or steel, with a hole at one end for attaching a line or cord, also two oblong holes or slots, which allow it to slide on the spring, and is held there by the rivets $f\ f$, the other end being bent so as to be inserted in the notch on the back of the hook, as shown in Fig. 2, at $k$.

$d$ is a hook made of iron in the manner shown, having one end bent so as to catch over the edge of the upper spring, and also a notch which catches on a pin in the hook $a$, as shown at $i$ in Fig. 3, thereby enabling the trap to be set without the use of the slide $c$.

$e$ is the strap or stirrup in which the ends of the hooks are fastened.

$f\ f$ are two rivets with large heads, the one serving to rivet the spring together, and both to hold and govern the slide $c$.

$g$ is a cord or line attached to the end of the slide $c$, as used in taking fish, either with or without the use of the hook $d$.

$h$ is a chain attached to the strap or stirrup $e$, as used in taking animals.

$i$ is a pin inserted in the hook $a$, on which the hook $d$ takes hold when set.

$j$ is the nut on the end of the strap or stirrup $e$, which makes it fast to the lower spring $b$.

$k$ is the notch in the hook $a$ on which the slide $c$ takes hold in setting the trap, as shown in Fig. 2.

$l$ is a small cord which secures the hook $d$ when disengaged from the trap in setting.

What I claim as my invention, and desire to secure by Letters Patent, is—

The form of the hook $d$ and the manner of setting the trap by the use of said hook, constructed and operating substantially as herein described.

WARREN JENKS.

Witnesses:
LORENZO HULL,
ELISHA BAKER.